US 6,737,965 B2

(12) United States Patent
Okubo

(10) Patent No.: US 6,737,965 B2
(45) Date of Patent: May 18, 2004

(54) TIRE CONDITION MONITORING APPARATUS

(75) Inventor: Youichi Okubo, Ogaki (JP)

(73) Assignee: Pacific Industrial Co., Ltd., Gifu-ken (JP)

(*) Notice: Subject to any disclaimer, the term of this patent is extended or adjusted under 35 U.S.C. 154(b) by 75 days.

(21) Appl. No.: 10/279,947

(22) Filed: Oct. 24, 2002

(65) Prior Publication Data
US 2003/0080861 A1 May 1, 2003

(30) Foreign Application Priority Data
Oct. 25, 2001 (JP) ........................................ 2001-328171

(51) Int. Cl.⁷ ............................................. B60C 23/00
(52) U.S. Cl. ................... 340/445; 340/442; 340/447; 340/10.1; 340/426.13; 340/426.15; 340/426.33; 340/825.69; 340/825.72; 73/146.5; 701/2
(58) Field of Search ................. 340/445, 442, 340/447, 10.1, 426.13, 426.15, 426.33, 825.69, 825.72; 73/146.5; 701/2

(56) References Cited

U.S. PATENT DOCUMENTS

| 5,602,524 | A | * | 2/1997 | Mock et al. ................. 340/447 |
| 6,243,007 | B1 | * | 6/2001 | McLaughlin et al. ....... 340/447 |
| 6,340,929 | B1 | * | 1/2002 | Katou et al. ................ 340/447 |

FOREIGN PATENT DOCUMENTS

JP        2000-153703        6/2000

* cited by examiner

Primary Examiner—Daniel J. Wu
Assistant Examiner—Tai T. Nguyen

(57) ABSTRACT

A commander transmits a command signal that includes a channel code set by a channel code setting switch. When receiving the transmission command signal from the commander, a transmitter transmits a response signal that contains the channel code contained in the command signal and a unique ID code of the transmitter. When receiving the response signal from the transmitter, a receiver stores the ID code contained in the response signal in the memory if the channel code contained in the response signal is related to a channel code set by a channel code setting switch. As a result, the ID codes of the transmitter is correctly registered in the receiver.

8 Claims, 4 Drawing Sheets

US 6,737,965 B2

TIRE CONDITION MONITORING APPARATUS

BACKGROUND OF THE INVENTION

The present invention relates to an apparatus for monitoring the condition of the tires of a vehicle.

Japanese Laid-Open Patent Publication No. 2000-153703 discloses a tire condition monitoring apparatus that includes transmitters and a receiver. Each transmitter is located in one of the tires of a vehicle. The receiver is located in the vehicle body. Unique identification data, or an ID code, is assigned to each transmitter. Each transmitter transmits a signal that includes pressure data, which is obtained by measuring the air pressure of the corresponding tire, and the ID code to the receiver. When receiving the signal, the receiver checks the ID code contained in the signal against the ID codes of the transmitters previously registered in the receiver. If a matching ID code has been registered at the receiver, the receiver outputs the pressure data contained in the signal to a display device located in the passenger compartment.

When registering the ID codes of the transmitters of the above monitoring apparatus, a commander is used. The commander sends predetermined command to the transmitters at an arbitrary time. When receiving a command from the commander, each transmitter transmits its own ID code to the receiver. Therefore, if the receiver is in a registration mode, which permits the registration of the ID codes of the transmitters, the ID codes of the transmitters can be registered in the receiver at any moment.

However, if the receiver receives an ID code from a transmitter of a monitoring apparatus mounted on another vehicle during the registration mode, the receiver registers the ID code. Therefore, when the ID codes of the transmitters in a vehicle are being registered, a nearby vehicle having a monitoring apparatus can cause erroneous registrations of ID codes.

SUMMARY OF THE INVENTION

Accordingly, it is an objective of the present invention to provide a tire condition monitoring apparatus that correctly registers identification data of transmitters in a receiver.

To achieve the foregoing and other objectives and in accordance with the purpose of the present invention, an apparatus for monitoring the condition of a tire of a vehicle is provided. The apparatus includes a commander, a transmitter, and receiver. The commander has a first selector and a first transmission circuit. The first selector selects one of a plurality of different first channel codes. The first transmission circuit transmits a command signal that contains the selected one of the first channel codes. The transmitter is provided at the tire. The transmitter includes a tire condition sensor for detecting the condition of the tire, a first memory for storing unique identification data, a first reception circuit for receiving the command signal from the commander, and a second transmission circuit for transmitting signals. In response to the reception of the command signal by the first reception circuit, the second transmission circuit transmits a response signal, which contains the first channel code contained in the command signal and the identification data in the first memory. The receiver is provided at the body of the vehicle. The receiver includes a second selector, a second reception circuit, a second memory, and a controller. The second selector selects one of a plurality of different second channel codes. The second reception circuit receives signals from the transmitter. The second memory stores the identification data of the transmitter. Each first channel code is related to one of the second channel codes. When the second reception circuit receives the response signal, the controller stores the identification data contained in the response signal in the second memory if the first channel code contained in the response signal is related to the selected one of the second channel codes.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 5.

Figure 1:
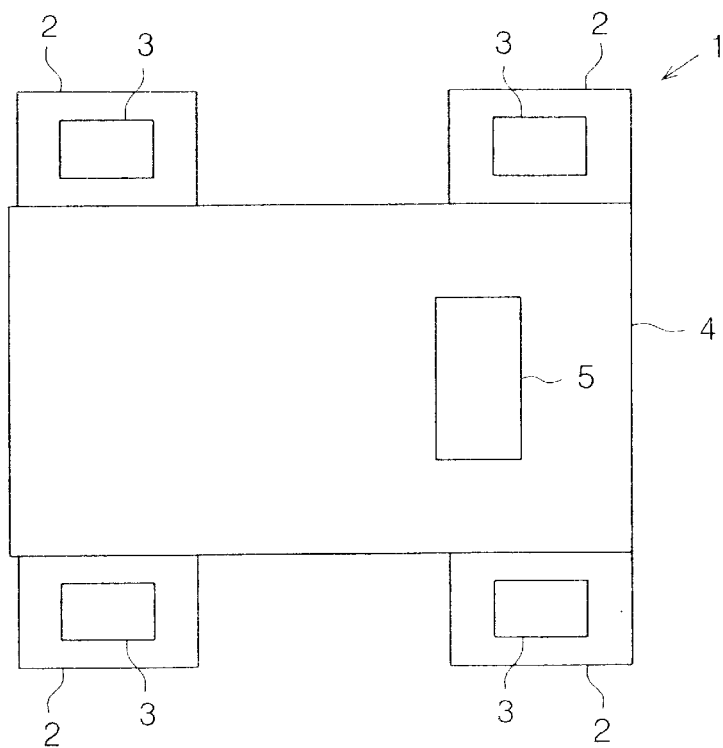
FIG. 1 is a schematic view showing a vehicle with a tire condition monitoring apparatus according to one embodiment of the present invention.

FIG. 1 shows a vehicle 1 with a tire condition monitoring apparatus according to this embodiment. As shown in FIG. 1, the vehicle 1 has a body 4, tires 2. The monitoring apparatus includes transmitters 3 and a receiver 5. Each transmitter 3 is located in one of the tires 2. The receiver 5 is mounted on the body 4. The monitoring apparatus is formed with the transmitters 3, the receiver 5, and a commander 6 (see FIGS. 2 and 3).

Figure 3:
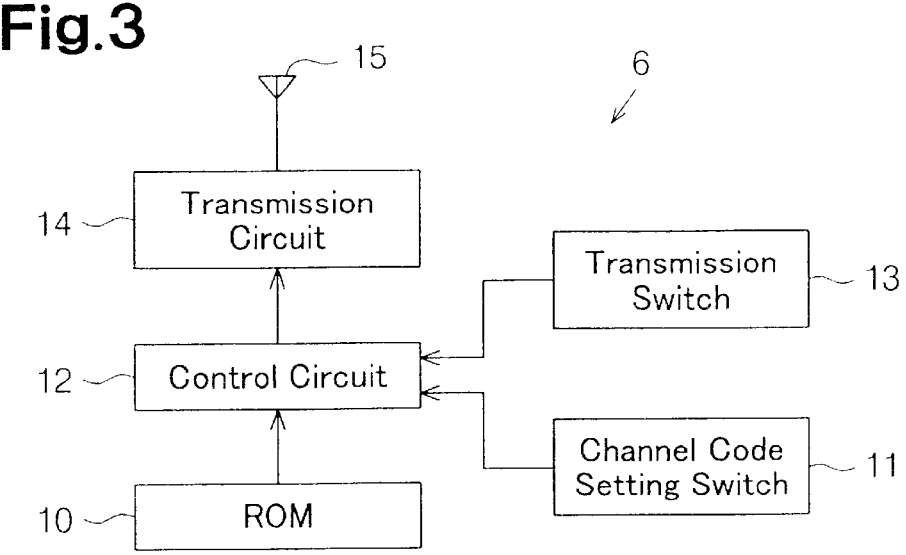
FIG. 3 is a block diagram showing the commander of FIG. 2.

FIG. 3 shows the commander 6. The commander 6 includes a read only memory (ROM) 10, a selector, a control circuit 12, a transmission switch 13, a transmission circuit 14, and a transmission antenna 15. In this embodiment, the selector is a channel code setting switch 11.

The ROM 10 stores command data transmitted to each transmitter 3. The command data is used for forcibly causing each transmitter 3 to perform transmission.

The setting switch 11 is manipulated for selecting arbitrary one of previously set channel codes. In this embodiment, four three-bit channel codes, for example, 001, 010, 011, and 100 are prepared. A channel code selected by the setting switch 11, or a set channel code, is sent to the control circuit 12.

When the transmission switch 13 is turned on, the control circuit 12 sends a transmission command signal to the transmission circuit 14. The transmission command signal includes the command data stored in the ROM 10 and the channel code set by the setting switch 11.

The transmission circuit 14 wirelessly transmits the transmission command signal sent from the control circuit 12 through the transmission antenna 15.

Figure 2:
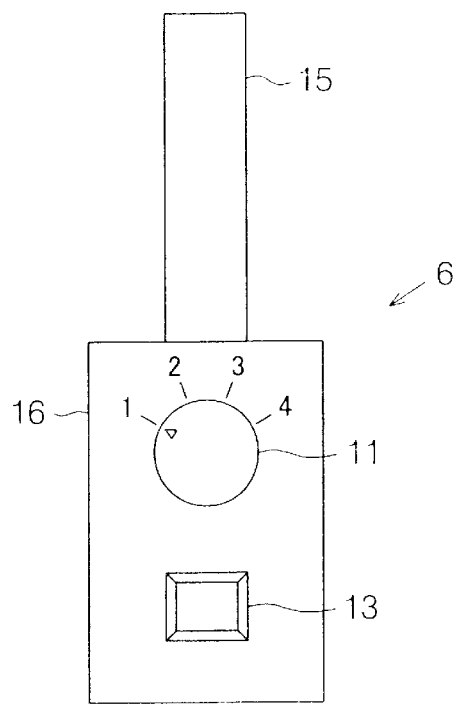
FIG. 2 is an external view showing a commander of the monitoring apparatus shown in FIG. 1.

FIG. 2 shows the external view of the commander 6. As shown in FIG. 2, the commander 6 portable and includes a box-shaped housing 16. The transmission antenna 15 extends from the housing 16. The dial type setting switch 11 and the push-button type transmission switch 13 are arranged on the front side of the housing 16.

Figure 4:
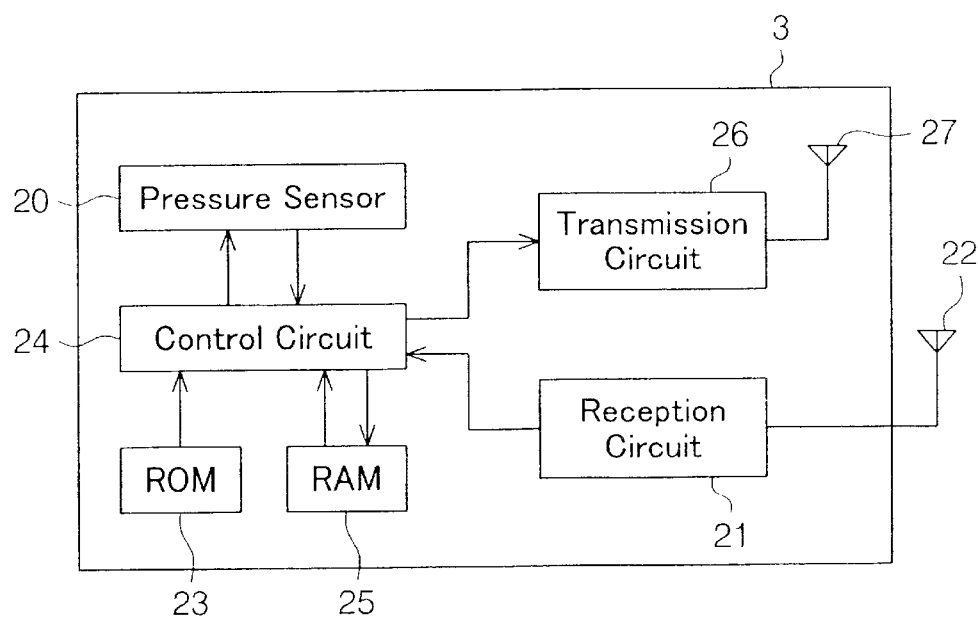
FIG. 4 is a block diagram showing a transmitter of the monitoring apparatus shown in FIG. 1.

As shown in FIG. 4, each transmitter 3 includes a tire condition sensor, a reception circuit 21, a reception antenna 22, a read only memory (ROM) 23, a control circuit 24, a random access memory (RAM) 25, a transmission circuit 26, and a transmission antenna 27. In this embodiment, the tire condition sensor is a pressure sensor 20.

The pressure sensor 20 measures the air pressure of the corresponding tire 2 and outputs a detected pressure data to the control circuit 24.

The ROM 23 previously stores unique identification data assigned to the associated transmitter 3, or an ID code.

The control circuit 24 sends data that contains the pressure data sent from the pressure sensor 20 and the ID code stored in the ROM 23 to the transmission circuit 26. The transmission circuit 26 encodes and modulates the data received from the control circuit 24. The transmission circuit 26 then wirelessly sends a signal containing the data through the transmission antenna 27.

The control circuit 24 causes the pressure sensor 20 to perform measuring at predetermined time intervals. Also, every time the number of measurement by the pressure sensor 20 reaches a predetermined number, the control circuit 24 causes the transmission circuit 26 to perform periodic transmission (periodic transmission mode). However, for example, when judging that there is an abnormality in the air pressure of the associated tire 2 (a sudden change or a drop of the air pressure), the control circuit 24 immediately causes the transmission circuit 26 to perform transmission (abnormal transmission mode) regardless of the periodic transmissions.

The reception circuit 21 receives the transmission command signal sent from the commander 6 through the reception antenna 22 and outputs the signal to the control circuit 24. Although not illustrated in the drawings, a valve stem protruding from the wheel to which the tire 2 is attached serves as the reception antenna 22. When receiving the transmission command signal, the control circuit 24 temporarily stores the channel code contained in the command signal in the RAM 25. Also, in response to the reception of the transmission command signal, the control circuit 24 causes the transmission circuit 26 to perform transmission (forced transmission mode). Immediately thereafter, the control circuit 24 deletes the channel code in the RAM 25.

Signals transmitted by each transmitter 3 will now be described. In any of the periodic transmission mode, the abnormal transmission mode, and the forced transmission mode, a signal transmitted by each transmitter 3 includes at least one data frame, preferably consecutive data frames. Each data frame includes various types of data, that is, synchronous data, the channel code, the ID code, the pressure data, voltage data, and error detection code. The synchronous data indicates the beginning of each data frame. The voltage data indicates the voltage of a battery (not shown), which is the power source of the transmitter 3. The error detection data permits the receiver 5 to judge whether the associated data frame has an error. The consecutive data frames are identical. That is, in a single transmission, each transmitter 3 transmits the same data frame, which includes the above-described types of data, for several consecutive times.

In the transmission according to the forced transmission mode, the channel code contained in the data frame is the one currently stored in the RAM 25, or one of 001, 010, 011, and 100. That is, in the forced transmission in response to the transmission command signal from the commander, the transmitter 3 stores the channel code contained in the received transmission command signal in the transmission signal. On the other hand, in the transmission according to the periodic transmission mode and the abnormal transmission mode, the channel code contained in the data frame is different from the one set by the commander 6, and is, for example, 000.

Each transmitter 3 may include a temperature sensor for measuring the internal temperature of the corresponding tire 2 as the tire conditioner sensor. In this case, each data frame contains data representing the measured temperature.

Figure 5:
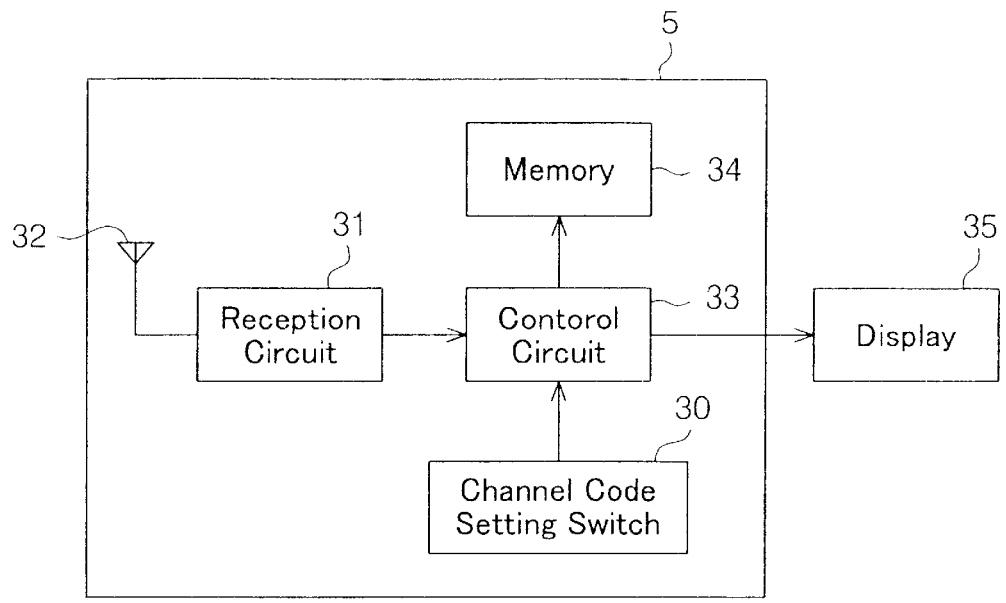
FIG. 5 is a block diagram showing a receiver of the monitoring apparatus shown in FIG. 1.

As shown in FIG. 5, the receiver 5 includes a selector, a reception circuit 31, a reception antenna 32, a controller, and a memory 34. In this embodiment, the selector is a channel code setting switch 30, and the controller is a control circuit 33.

The setting switch 30 is manipulated for selecting arbitrary one of previously set channel codes. In this embodiment, five three-bit channel codes, for example, 001, 010, 011, 100, and 000 are prepared. A channel code selected by the setting switch 30, or a set channel code, is sent to the control circuit 33.

The reception circuit 31 receives signals sent from the transmitters 3 through the reception antenna 32 and outputs the signals to the control circuit 33.

If a channel code other than 000 is set for the receiver 5, the receiver 5 operates in the ID code registration mode. In this case, if the channel code contained in a signal from one of the transmitters 3 is 000, the control circuit 33 of the receiver 5 discontinues the subsequent process and returns to a reception standby state. On the other hand, if the channel code contained in a signal from one of the transmitters 3 is any of 001, 010, 011, and 100, the control circuit 33 judges whether the channel code matches the channel code set for the receiver 5 by the setting switch 30. If the channel codes match, the control circuit 33 stores the ID code contained in the received signal in the memory 34.

By contrast, if the channel code 000 is set for the receiver 5, the receiver 5 operates in an air pressure monitoring mode. In this case, regardless of the channel code contained in a signal from the transmitters 3, the control circuit 33 of the receiver 5 judges whether the ID code contained in the signal from the transmitter 3 matches any of the ID codes stored in the memory 34. If the ID codes match, the control circuit 33 processes the received signal. That is, the control circuit 33, for example, outputs the pressure data contained in the received signal to the display unit 35 in the passenger compartment.

In the monitoring apparatus of this embodiment, the ID codes of the transmitters 3 are registered in the receiver 5 in the following manner.

First, the setting switch 11 of the commander 6 is manipulated to set a channel code for the commander 6.

Then, the setting switch 30 of the receiver 5 is manipulated to set the same channel code as that of the commander 6 for the receiver 5.

In this manner, the same channel codes are set for the receiver 5 and the commander 6. Then, the transmission antenna 15 of the commander 6 is brought close to the reception antenna 22 of one of the transmitter 3 the ID code of which is to be registered. Thereafter, the transmission switch 13 of the commander 6 is turned on. This causes the commander 6 to transmit the transmission command signal containing the command data and the channel code. Since the radio field intensity of the transmission command signal transmitted by the commander 6 is relatively feeble, the signal cannot be received by the transmitters 3 other than the one located close to the transmission antennal 15 of the commander 6.

When receiving the transmission command signal from the commander 6, the transmitter 3 transmits a signal that contains the channel code contained in the received signal and the ID code stored in the ROM 23. When receiving the signal from the transmitter 3, the receiver 5 determines whether the channel code contained in the signal matches the channel code that has been set for the receiver 5 by the setting switch 30. If the channel codes match, the receiver 5 stores the ID code contained in the signal in the memory 34.

The above procedure is consecutively executed for all the transmitters 3 provided in the vehicle 1. As a result, the ID codes of all the transmitters 3 are registered in the receiver 5.

This embodiment provides the following advantages.

If a received signal does not include a channel code that matches the channel code that has been previously set for the receiver 5, the receiver 5 does not store the ID code contained in the signal in the memory 34. This effectively prevents ID codes from being erroneously registered at the receiver 5.

As long as the same channel codes are set for the receiver 5 and the commander 6, turning the transmission switch 13 of the commander 6 on permits the ID code of each transmitter 3 to be easily registered in the receiver 5 at any time.

The above embodiment may be modified as follows.

Figure 6:
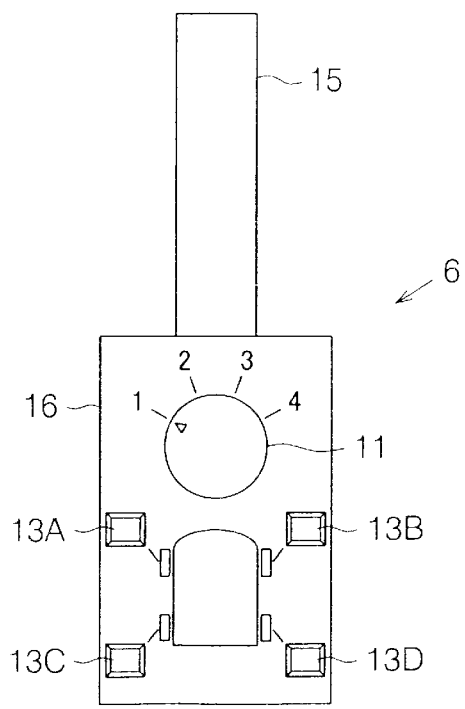
FIG. 6 is an external view showing a commander of a tire condition monitoring apparatus according to another embodiment of the present invention.
Figure 7:
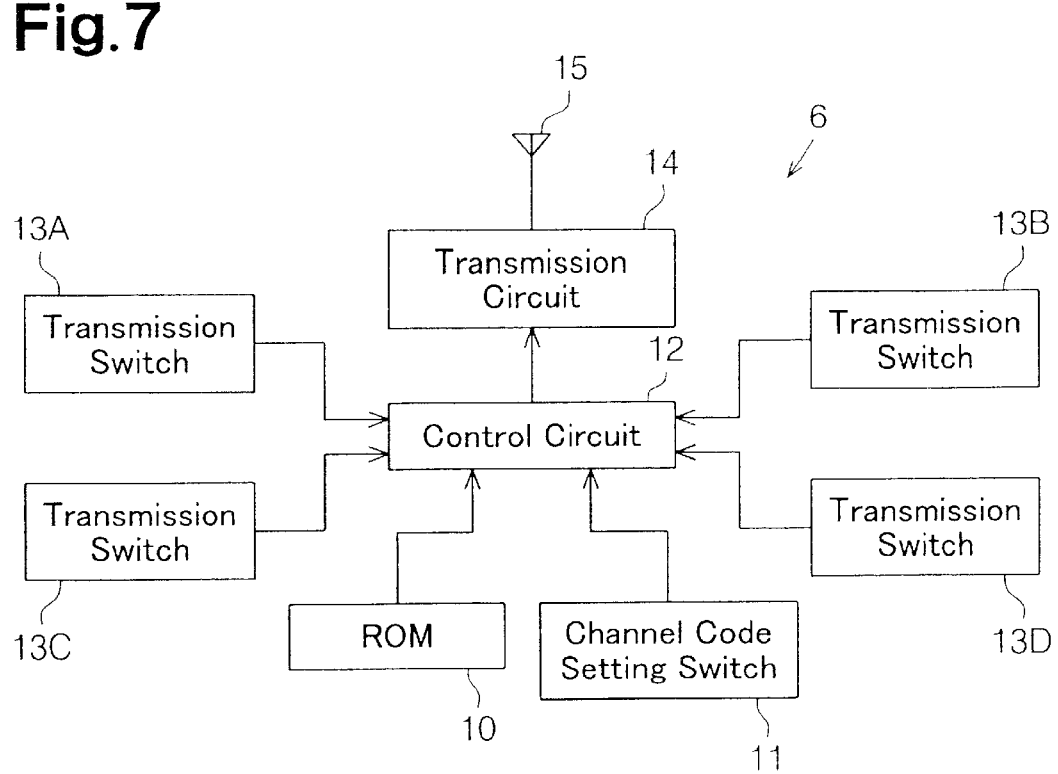
FIG. 7 is a block diagram showing the commander of FIG. 6.

As shown in FIGS. 6 and 7, the commander 6 may have a plurality of transmission switches 13A to 13D. Each of the switches 13A to 13D corresponds to the position of one of the four tires 2 of the vehicle 1. When any of the switches 13A to 13D is turned on, the transmission command signal that further includes a unique position code assigned to the switch is transmitted. The position code indicates the position of the tire 2. For example, the position code assigned to the switch 13A corresponding to the left front tire 2 is 00, the position code assigned to the switch 13B corresponding to the right front tire 2 is 01, the position code assigned to the switch 13C corresponding to the left rear tire 2 is 10, and the position code assigned to the switch 13D corresponding to the right rear tire 2 is 11.

The transmitter 3 that has received the transmission command signal temporarily stores the channel code and the position code contained in the received signal in the RAM 25, and transmits a signal that contains the channel code and the position code. When in the ID code registration mode, the receiver 5 stores ID code contained in the signal from the transmitter 3 in the memory 34 in the same manner as the embodiment of FIGS. 1 to 5. Also, the receiver 5 stores the position code contained in the signal from the transmitter 3 in the memory 34 while linking the position code with the ID code.

In this manner, the ID code of each transmitter 3 is registered while being linked with the position information of the tire 2 to which the transmitter 3 is mounted. Therefore, when receiving a signal from one of the transmitters 3 during the air pressure monitoring mode, the receiver 5 is capable of determining the position of the tire 2 in which the transmitter 3 that has transmitted the signal is mounted.

The transmission switches 13A to 13D function as specifying switches for specifying the position of arbitrary one of the tires 2 relative to the vehicle 1, or specifying means.

The signal transmitted by each transmitter 3 during the forced transmission mode need not necessarily contain the pressure data and the voltage data as long as the signal contains at least the channel code and the ID code.

The four channel codes set for the commander 6 may be different from the four channel codes set for the receiver 5 in the ID code registration mode. That is, each of a plurality of channel codes set for the commander 6 is previously related with one of a plurality of channel codes set for the receiver 5. The channel codes in each related pair are different from each other. If the channel code contained in a signal from one of the transmitters 3 is related to one of the channel codes set for the receiver 5, the ID code in the signal from the transmitter 3 is registered in the receiver 5.

Therefore, the present examples and embodiments are to be considered as illustrative and not restrictive and the invention is not to be limited to the details given herein, but may be modified within the scope and equivalence of the appended claims.

What is claimed is:

1. An apparatus for monitoring the condition of a tire of a vehicle, the apparatus comprising:

a commander having a first selector and a first transmission circuit, wherein the first selector selects one of a plurality of different first channel codes, and wherein the first transmission circuit transmits a command signal that contains the selected one of the first channel codes;

a transmitter provided at the tire, wherein the transmitter includes a tire condition sensor for detecting the condition of the tire, a first memory for storing unique identification data, a first reception circuit for receiving the command signal from the commander, and a second transmission circuit for transmitting signals, wherein, in response to the reception of the command signal by the first reception circuit, the second transmission circuit transmits a response signal, the response signal containing the first channel code contained in the command signal and the identification data in the first memory; and a receiver provided at the body of the vehicle, wherein the receiver includes a second selector, a second reception circuit, a second memory, and a controller, wherein the second selector selects one of a plurality of different second channel codes, wherein the second reception circuit receives signals from the transmitter, wherein the second memory stores the identification data of the transmitter, wherein each first channel code is related to one of the second channel codes, wherein, when the second reception circuit receives the response signal, the controller stores the identification data contained in the response signal in the second memory if the first channel code contained in the response signal is related to the selected one of the second channel codes.

2. The apparatus according to claim 1, wherein the transmitter has a first transmission mode, in which the transmitter transmits the response signal in response to the command signal from the commander, and a second transmission mode, in which the transmitter transmits signals regardless of the command signal from the commander, wherein a signal transmitted according to the second transmission mode includes at least data representing the tire condition detected by the tire condition sensor and the identification data; and wherein the receiver has a first operation mode, in which the registration of the identification data is permitted, and a second operation mode, in which the registration of the identification data is prohibited, wherein, in the second operation mode, if the identification data contained in a signal sent from the transmitter matches the identification data in the second memory, the controller of the receiver reads out the data representing the tire condition from the received signal.

3. The apparatus according to claim 2, wherein the second selector has a function to select the operation mode of the receiver.

4. The apparatus according to claim 1, wherein the commander includes a transmission switch, the transmission switch being manipulated to transmit the command signal.

5. The apparatus according to claim 4, wherein the tire is one of a plurality of tires, wherein the transmitter is one of a plurality of transmitters each of which is provided at one of the tires, wherein the transmission switch is one of a plurality of transmission switches, each transmission switch being related to the position of one of the tires relative to the vehicle, wherein the command signal further contains a position code representing the position of the tire that is related to the manipulated transmission switch, wherein the response signal further contains the position code contained in the command signal, and wherein the controller of the receiver stores the identification data and the position code contained in the response signal in the second memory while linking the identification data and the position code with each other.

6. The apparatus according to claim 1, wherein the tire is one of a plurality of tires, wherein the transmitter is one of a plurality of transmitters each of which is provided at one of the tires, wherein the commander includes a specifying switch for specifying the position of arbitrary one of the tires relative to the vehicle, wherein the command signal further contains a position code representing the position of the specified tire, wherein the response signal further contains the position code contained in the command signal, and wherein the controller of the receiver stores the identification data and the position code contained in the response signal in the second memory while linking the identification data and the position code with each other.

7. An apparatus for monitoring the condition of a plurality of tires attached to a vehicle, the apparatus comprising:

a portable commander having a first selector, specifying means, and a first transmission circuit, wherein the first selector selects one of a plurality of different first channel codes, wherein the specifying means specifies the position of arbitrary one of the tires relative to the vehicle, and wherein the first transmission circuit transmits a command signal that contains the selected first channel code and the position code representing the position of the specified tire;

a plurality of transmitters each being provided at one of the tires, wherein each transmitter includes a tire condition sensor for detecting the condition of the corresponding tire, a first memory for storing unique identification data, a first reception circuit for receiving the command signal from the commander, and a second transmission circuit for transmitting signals, wherein, in response to the reception of the command signal by the first reception circuit, the second transmission circuit transmits a response signal, the response signal containing the first channel code and the position code contained in the command signal and the identification data in the first memory; and a receiver provided at the body of the vehicle, wherein the receiver includes a second selector, a second reception circuit, a second memory, and a controller, wherein the second selector selects one of a plurality of different second channel codes, wherein the second reception circuit receives signals from the transmitter, wherein the second memory stores the identification data of the transmitters, wherein each first channel code is identical with one of the second channel codes, wherein, when the second reception circuit receives the response signal, if the first channel code contained in the response signal matches the selected one of the second channel codes, the controller stores the identification data and the position code contained in the response signal in the second memory, while liking the identification data and the position code with reach other.

8. The apparatus according to claim 7, wherein the specifying means includes a plurality of transmission switches, the transmission switches being manipulated for transmitting the command signal, wherein each transmission switch is related to the position of one of the tires relative to the vehicle.

* * * * *